United States Patent [19]

Kalmar

[11] 4,202,094
[45] May 13, 1980

[54] ROTARY MACHINE ATTACHMENT

[76] Inventor: Irene Kalmar, 49 Young St., Sylvania Heights, New South Wales 2224, Australia

[21] Appl. No.: 920,127

[22] Filed: Jun. 28, 1978

[30] Foreign Application Priority Data

Jul. 5, 1977 [AU] Australia ............................... PD0711

[51] Int. Cl.² ...................... B26B 27/00; A01D 55/18
[52] U.S. Cl. ....................................... 30/276; 56/12.7; 30/500
[58] Field of Search ................. 30/276, 347, 500, 122; 56/12.7, 295

[56] References Cited

U.S. PATENT DOCUMENTS

| | | | |
|---|---|---|---|
| 3,218,789 | 11/1965 | Ott | 30/276 X |
| 4,097,991 | 7/1978 | Proulx | 30/276 |
| 4,114,269 | 9/1978 | Ballas | 30/276 |

FOREIGN PATENT DOCUMENTS 6938265  9/1969  Fed. Rep. of Germany ............ 56/12.7

Primary Examiner—Jimmy C. Peters
Attorney, Agent, or Firm—Oliver E. Todd, Jr.

[57] ABSTRACT

A grass cutting attachment for an electrically powered handyman's drill is disclosed. A length of flexible filament extends radially from a body rotatable by the drill. The rotating filament end is able to cut both edges of lawn and expanses of lawn. A handle attachment which prevents stooping and bending by an operator is also disclosed.

5 Claims, 3 Drawing Figures

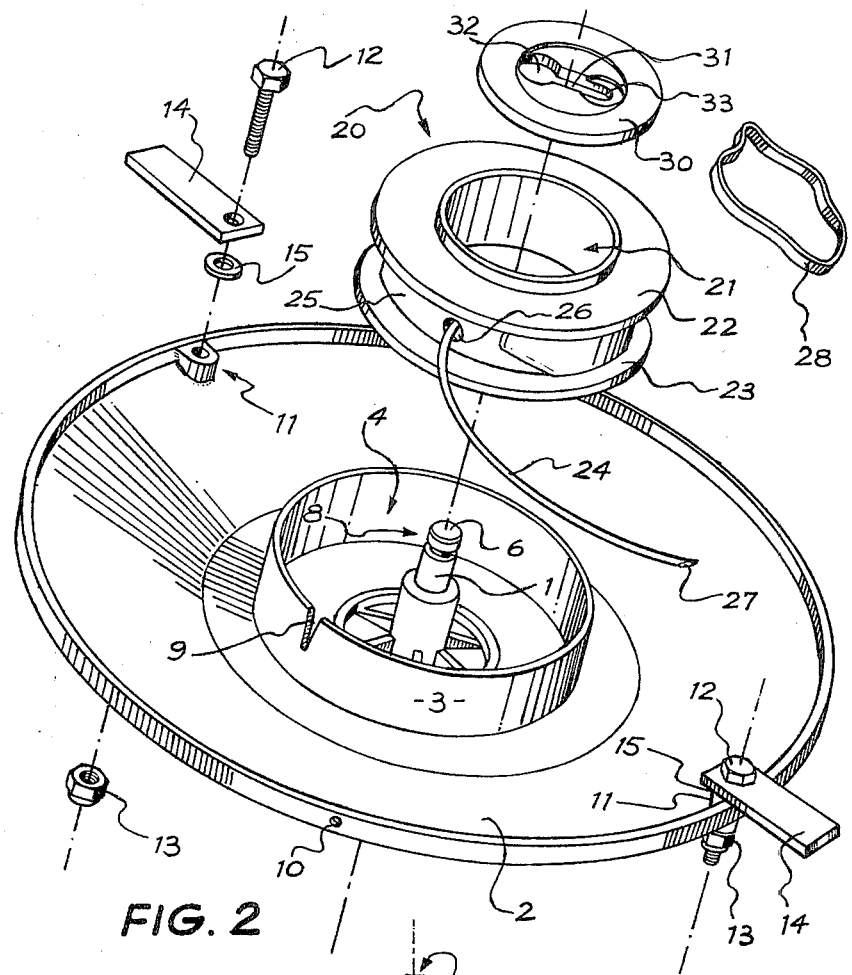
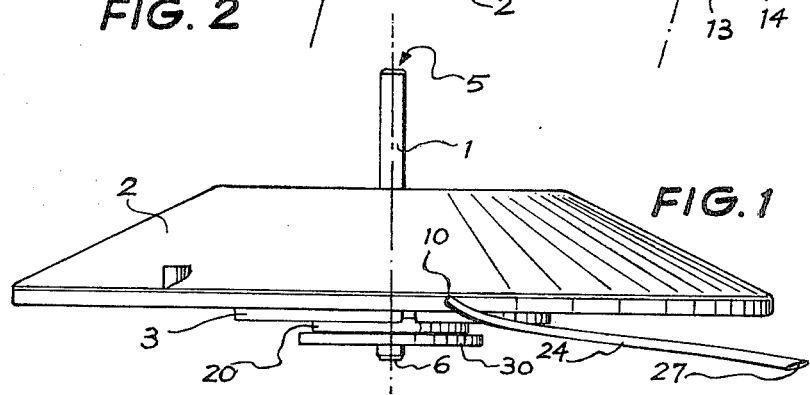

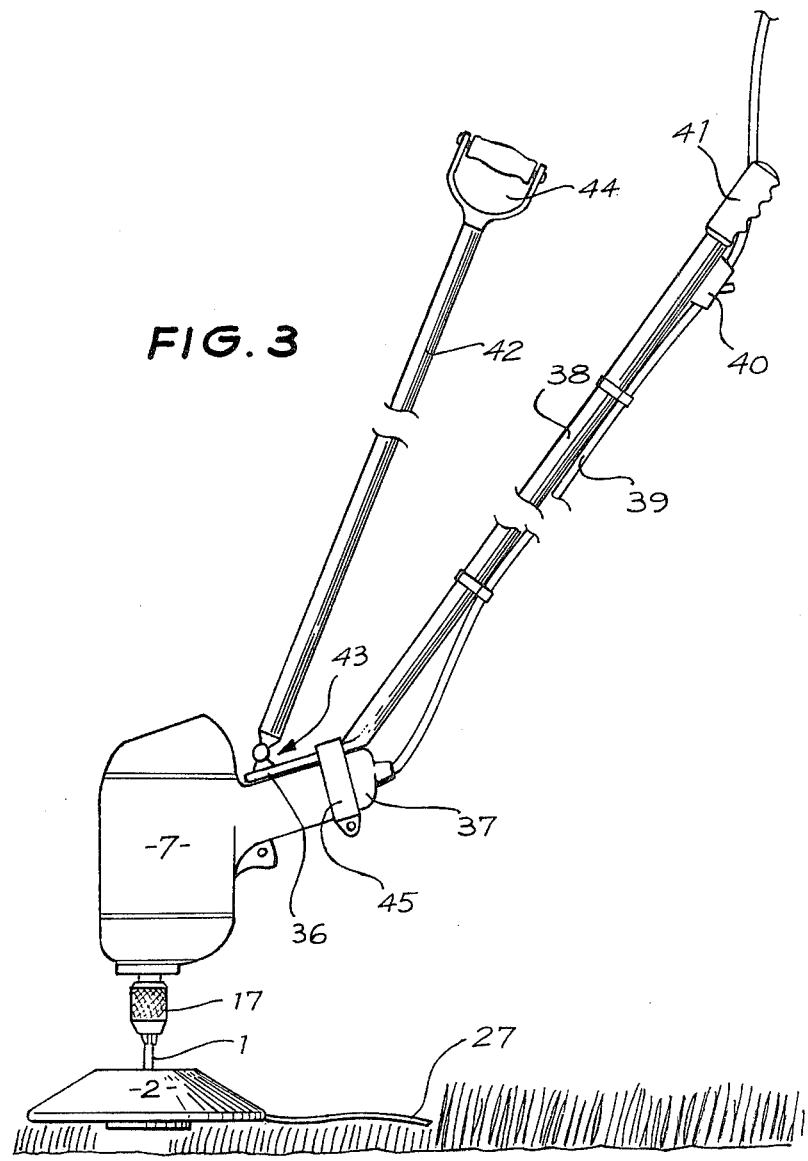

ROTARY MACHINE ATTACHMENT

The present invention relates to a grass cutting attachment for a rotary machine such as an electrically operated drill. Most handymen and tradesmen have such a drill and a wide range of attachments are available to permit such a drill to provide the basic rotary machine used to perform a wide number of operations such as drilling, grinding, sanding and the like. However, hitherto, a grass cutting attachment for such a drill has not been known, particularly for use in trimming the edges of grass lawns.

It is known to trim the edges of lawns adjacent paths and driveways by means of a wide number of manually operated tools such as shears and rotary cutters. However such tools, being manually operated are inherently slow and laborious. In addition, repeated use of such tools often causes damage to the path or driveway resulting in chipped and broken concrete or stone work.

It is also known to have lawn edgers which are operated by small internal combustion engines. Although such apparatus overcomes one of the disadvantages of manually operated devices, these prior art devices are still subject to the disadvantage that they cause damage to the adjacent paths or stone work.

Flail type lawn mowers are also known in which grass is cut by means of a flail or flexible length of material which may be a length of wire, chord or even linked rigid members as in a chain. However, such flail type lawn mowers are generally as expensive as a conventional lawn mower having cutting blades since the majority of the cost is accounted for by the motor (whether electric or internal combustion) and the chassis of the lawn mower. Differences, if any, between the cost of cutting blades or flails are negligible.

It is the object of the present invention to provide at attachment for a rotary machine, such as an electrically operated drill, which will permit the easy trimming of the edges of grass lawns. In this connection, the invention is particularly suitable for use with chordless electric drills having rechargeable batteries, however, the invention is not so limited.

According to one aspect of the present invention there is disclosed a grass cutting attachment for a rotary machine, said attachment comprising a shaft adapted at one end thereof to be rotated by said rotary machine, means to secure a bobbin having a length of filament wound thereon, to said shaft for rotation therewith, and retaining means to retain said wound filament in position on said bobbin with one end of said filament extending from said bobbin whereby, on rotation of said shaft, said one end of said filament is extended radially away from said shaft under the action of a centrifugal force created by said rotation.

One advantage of the present invention, which will become apparent from the following description of the preferred embodiment is that for a relative small cost a person may purchase a grass cutting combination device which permits both lawn edges and also expanses of lawn to be cut. Whilst a conventional lawn mower having an internal combustion engine costs in the vicinity of $200, a small electrically operated drill having a pistol-grip may be purchased for approximately $20 and in many instances will already be owned by the prospective lawn mower purchaser. Accordingly, for a small capital outlay, approximately equivalent to the cost of such an electric drill, a person may purchase a grass cutting drill attachment. As a result, a complete lawn mowing apparatus may be purchased for approximately one fifth to one half of the price of a conventional lawn mower.

One embodiment of the present invention will now be described with the drawings in which:

FIG. 1 is a side elevation of the grass cutting attachment of the preferred embodiment, FIG. 2 is an exploded perspective view of the underside of the grass cutting attachment of FIG. 1 showing two optional cutter blade assemblies, and FIG. 3 is a side elevation of the grass cutting attachment of FIG. 1 inserted in the chuck of an electrically operated drill to which the preferred embodiment of a handle attachment is attached.

Referring now to FIGS. 1 and 2, the grass cutting attachment of the preferred embodiment comprises a metal shaft 1 to which a cup-shaped body 2 of moulded plastics material is secured. One end 5 of the shaft 1 is adapted to be inserted into the chuck 17 of a conventional electrically operated handyman's drill 7 (FIG. 3). A cylindrical flange 3 which is coaxial with the shaft 1 extends from one (lower) side of the cup-shaped body 2 so as to form an annular cavity 4 around the other end 6 of the shaft 1. An annular groove 8 is located immediately adjacent the other end 6 of the shaft 1.

A V-shaped slot 9 is located in the flange 3 and extends substantially parallel to the shaft 1. Immediately opposite the slot 9 is an aperture 10 in the periphery of the cup-shaped body 2. Two bosses 11 are also located on the periphery of the cup-shaped body 2 and opposite each other. Each boss 11 has a bore therethrough adapted to receive the shank of a bolt 12 which, when secured by nut 13, locates a cutter blade 14 and washer 15 as indicated in FIG. 2. Each cutter blade 14 is able to pivot under the influence of centrifugal forces into a radially extending position when the cup-shaped body 2 is rotated. Each bolt 12, nut 13, cutter blade 14 and washer 15 together makes up a cutter blade assembly. The two cutter assemblies are a preferment and are not essential to the present invention.

A filament carrying bobbin 20 is received by the annular cavity 4. The bobbin 20 is similar in construction to a conventional reel for fishing line and comprises a hollow cylindrical tube 21 of relatively short length having two annular discs 22 and 23 respectively, located at each end of the tube 21. The filament 24, which preferably comprises a length of fishing line having a diameter of 2 mm, is wound about the tube 21 of the bobbin 20.

A flexible cover strip 25 surrounds that portion of the filament 24 wound on the bobbin 20. The free end 27 of the filament 24 passes through an opening 26 in the cover strip 25 to extend away from the bobbin 20. The cover strip 25 is retained in place by any convenient means such as elasticized rubber band 28. Other arrangements such as a two piece moulded cooperating releasable clip (not illustrated) on the cover strip 25 may be used, the function of the cover strip 25 merely being to retain the wound filament 24 in position on the bobbin 20 during rotation of the grass cutting attachment.

The bobbin 20 is held in place in the annular cavity 4 by means of a circular plate 30 which has a slot 31 extending therethrough. At one end of the slot 31 is a circular aperture 32 having a diameter slightly larger than the diameter of the shaft 1. At the other end of the slot 31 is a circular indentation 33 which has an outer diameter slightly greater than that of the shaft 1. The transverse dimension of the slot 31 is substantially the same as the diameter of the annular groove 8. The thickness of the plate 30 to either side of the slot 31 is substantially equal to the width of the annular groove 8.

Therefore the bobbin 20 may be located in the annular cavity 4, and the plate 30 positioned over the other end 6 of the shaft 1, by passing the other end 6 through the circular aperture 32. If the plate 30 is then moved sideways, the slot 31 slides into the annular groove 8 with a frictional fit thereby clamping the bobbin 20 against the cup-shaped body 2. As a result, the bobbin 20 and cup-shaped body 2 are forced to rotate together. With the bobbin 20 so positioned, the free end 27 of the filament 24 is passed through the aperture 10 so as to extend radially away from the cup-shaped body 2. The filament 24 is clamped by wedging the filament 24 in the V-shaped slot 9.

If the plate 30 is slid further sideways in the abovedescribed direction, the circular indentation 33, rather than the slot 31, is positioned within the annular groove 8. Since the plate 30 has a reduced cross-section at the circular indentation 33, this permits the plate 30 to be loosely retained on the shaft 1 in this position. Accordingly, the bobbin 20 may be rotated relative to the shaft 1 but not withdrawn from the annular cavity 4. This freedom of movement of the bobbin 20 is desirable in order to position the bobbin 20 so that the filament 24, at the point where it passes through the opening 26 in cover strip 25, is located immediately opposite the V-shaped slot 9.

In operation, the end 5 of the shaft 1 is positioned within the chuck 17 of drill 7 (FIG. 3) or other similar drill. As the attachment is rotated by the drill 7, the free end 27 of the filament 24, which is preferably cut on the diagonal as illustrated in FIGS. 1 and 2, is flung radially outwardly by the centrifugal force produced by rotation of the attachment. Therefore if the drill 7 is moved so as to bring the end 27 of the filament 24 into contact with grass, the grass will be cut, or worn through, by the repeated flailing action of the free end 27 on the grass.

In this way the grass, whether part of an open expanse of lawn, or an edge of a lawn abutting some structure, may be cut to the desired length. However the filament 24 will not damage the concrete or stone work of the structure. Similarly the bark of trees and shrubs will not be damaged by the moving filament 24. Should the filament 24 accidentally come in contact with the hands, toes or feet of the person operating the drill, then no damage will result to that person since the moving filament 24 will not injure the operator.

The cutter blade assemblies (12 to 15) illustrated in FIG. 2 are provided in order that the grass cutting attachment of the preferred embodiment are able to cut extremely thick grass which has been neglected for a long period and has therefore grown coarse and rank. Once such grass has been cut to approximately the desired length by the cutter blade assemblies, these are no longer required and the filament alone is sufficient to maintain the grass at the desired length provided that the grass is cut as frequently as would normally be done with a lawn mower.

FIG. 3 illustrates an embodiment of a handle attachment which may be applied to the drill 7 so that the grass cutting attachment of the preferred embodiment can be used without the need for the operator to bend or stoop. The handle attachment comprises a base member 36 which is shaped to abut the surface of the pistol-grip handle 37 of the drill 7 furthest from the chuck 17. The base member 36 is clamped to the pistol-grip handle 37 by any suitable means such as a retaining band 45 which may be a conventional hose clamp, for example. A first elongated arm 38 is secured to one end of the base member 36 and extends upwardly at approximately 45° when the shaft 1 is in the vertical position illustrated in FIG. 3. A power chord 39, including an in line on-off switch 40, is held alongside the first arm 38 by means of the operator's right hand (not illustrated) which grasps the free end 41 of the first arm 38 and the power chord 39.

A second elongated arm 42 is connected, by means of a universal joint 43, to the base member 36 at a location spaced from the interconnection between the base member 36 and first elongated arm 38. A bifurcated handle 44 is secured to the free end of the second elonaged arm 42. Because of the universal joint 43, the second elongated arm 42 is able to move relative to the drill 7 and first elongated arm 38, however, any twisting force applied to the second elongated arm 42 will be transmitted to the drill 7.

The handle attachment illustrated in FIG. 3 permits the operator to easily mow large expanses of lawn. The free end 41 and power chord 39 are grasped by the right hand of the operator at approximately hip height. The bifurcated handle 44 is grasped by the left hand of the operator. The operator extends his left arm substantially horizontally so as to place the second elongated arm 42 in a more vertical position than that of the first elongated arm 38. With the hands and arms of the operator is the abovedescribed position, the weight of the drill 7 and grass cutting attachment are easily and conveniently supported, and the on-off switch 40 is in a convenient position for manipulation.

The operator then walks over the grass surface to be cut with the drill 7 operating and the rotating radially extended filament 24 produces the desired result. Should the operator wish to cut an edge of the lawn adjacent a path, or manoeuvre the grass cutting attachment near a rockery, for example, then a twisting force is applied to the bifurcated handle 44 and this twisting force is transmitted via the universal joint 43 to the drill 7. Accordingly, the angle of the grass cutting attachment relative to the grass is changed thereby causing the filament 24 to bear more heavily against some selected portion of grass.

It will be clear from the foregoing that the above-described handle attachment overcomes the need for any stooping or bending in the operation of the grass cutting attachment. In particular, those drills 7 having a squeeze trigger switch which has a retaining pin (not illustrated) which enables the squeeze trigger switch to be maintained in the on position without the need for finger pressure, are particularly suitable for such use since the on-off switch 40 in the power chord 39 of the drill 7 is able to start and stop the drill at will.

The foregoing describes only some embodiments of the present invention and modifications, obvious to those skilled in the art, may be made thereto without departing from the scope of the present invention.

What I claim is:

1. A grass cutting attachment for a rotary machine, said attachment comprising a shaft adapted at one end thereof to be rotated by said rotary machine; a cup shaped body coaxial with said shaft and secured thereto intermediate the ends thereof; said body having an interior cylindrical flange coaxial with said shaft and defining an annular cavity adjacent the other end of said shaft, said flange having a V-shape slit therein substantially parallel to said shaft and said body having an aperture therein at its periphery; a bobbin comprising a reel having a central tube with two parallel annular discs located one at each end of said tube, said reel being located within said annular cavity; means to secure said bobbin to said shaft; a length of filament having a portion thereof wound around said tube between said discs; and a flexible cover strip having an opening therein and wound around said filament portion located on said tube; the remainder of said filament passing through said opening, being clamped in said V-shaped slit and passing through said aperture whereby one end of said filament extends radially away from said shaft under the action of a centrifugal force created by said rotation.

2. An attachment as claimed in claim 1 wherein the bobbin securing means comprises a plate having a slot extending therethrough, a circular aperture at one end of said slot and a circular indentation in said plate at the other end of said slot; and an annular groove in said shaft adjacent said other end thereof; the diameter of said circular aperture and circular indentation being larger than the diameter of said shaft, the width of said slot being substantially constant and substantially equal to the diameter of said groove, and the thickness of said plate, at least adjacent the central portion of said slot, being substantially equal to the width of said annular groove whereby, with said shaft located in said circular aperture, said plate is removable from said shaft to permit removal or replacement of said bobbin, with said shaft located in said circular indentation said bobbin is retained on said shaft but rotatable thereabout, and with said shaft centrally located in said slot, said plate is wedged in said groove to clamp said bobbin against said cup-shaped body thereby securing said bobbin to said shaft for rotation therewith.

3. An attachment as claimed in claim 1 including two cutting blades, one located at each of two opposite locations on the periphery of said cup-shaped body, each blade extending in a plane substantially perpendicular to said shaft and being rotatable about an axis substantially parallel to said shaft.

4. The attachment as claimed in claim 1 in combination with an electrically operable drill, said one end of said shaft being inserted in the chuck of said drill.

5. The combination as claimed in claim 4 wherein said drill has a pistol-grip handle and a handle attachment is releasably secured to said pistol-grip handle, said handle attachment comprising a base member abutting and extending along said pistol-grip handle, a first elongated arm secured to one end of said member and extending from the free end of said pistol-grip handle in a direction away from the chuck of said drill, and a second elongated arm pivotally connected to said base member at a location spaced from said one end thereof.

* * * * *